Nov. 17, 1942.   J. C. V. RICHARDSON ET AL   2,302,574
METHOD FOR PRODUCING NUT BUTTER
Filed April 5, 1939   2 Sheets-Sheet 1
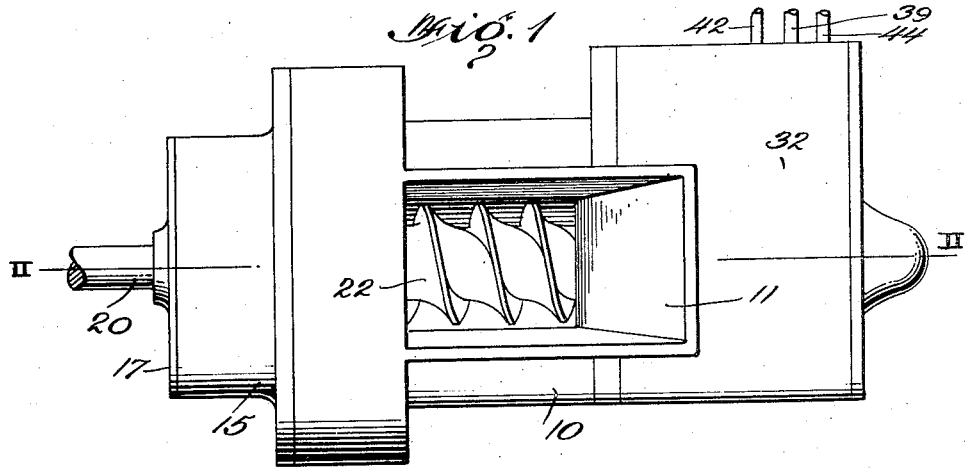
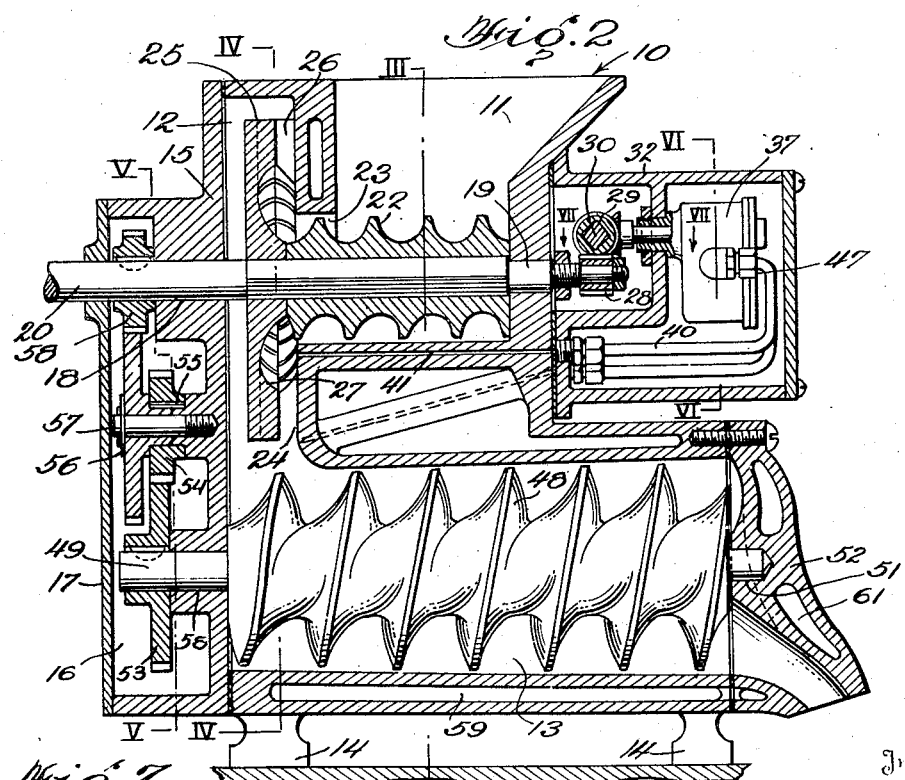
Inventors
Jonathan C. V. Richardson
Frederick H. Hoffman
W. S. McDowell
Attorney Nov. 17, 1942.  J. C. V. RICHARDSON ET AL  2,302,574
METHOD FOR PRODUCING NUT BUTTER
Filed April 5, 1939  2 Sheets-Sheet 2
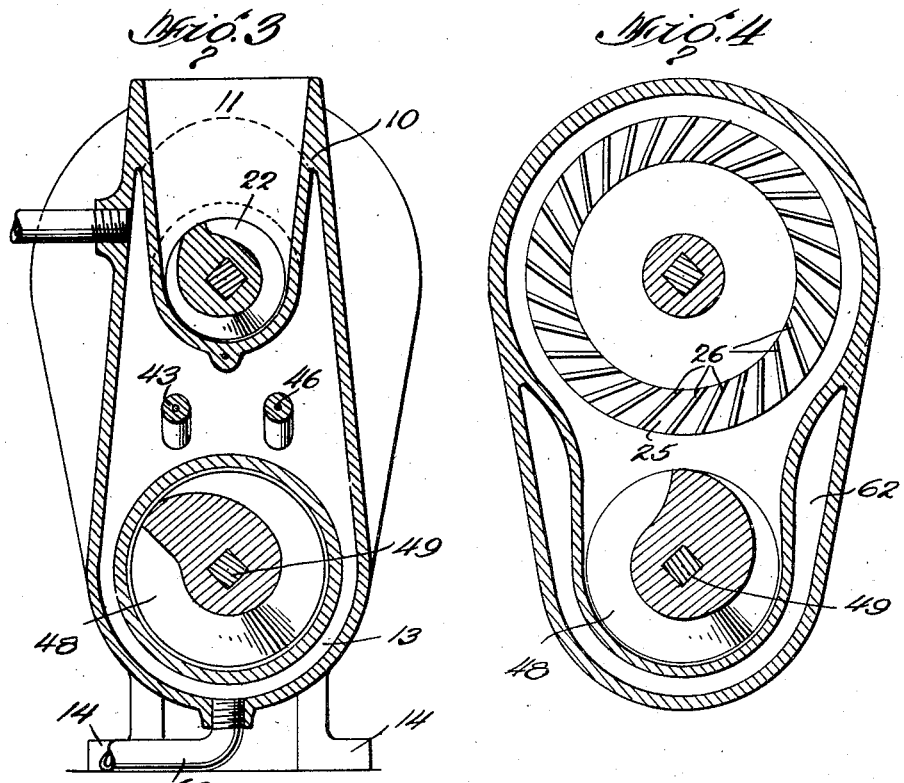
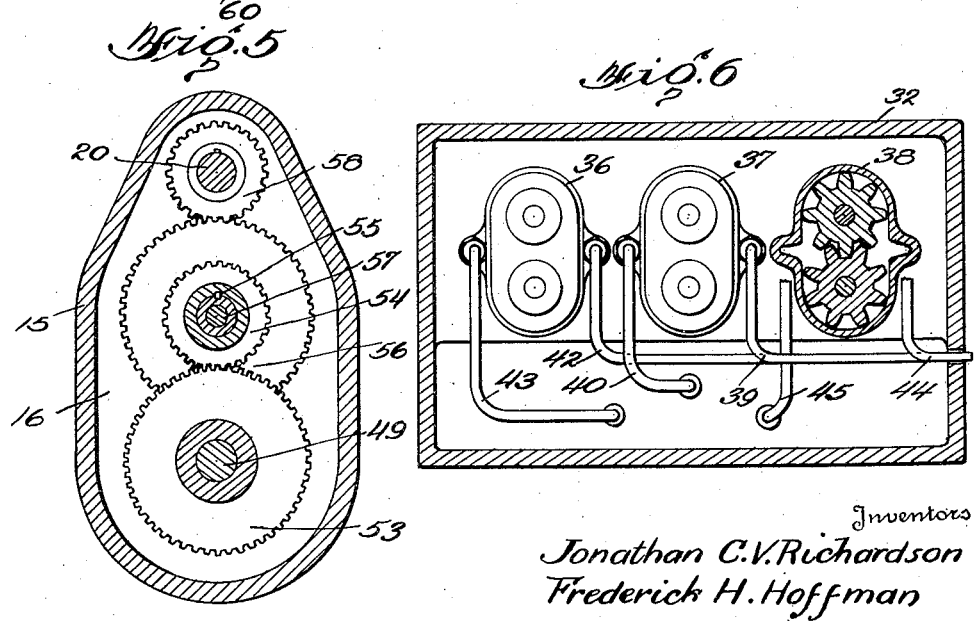
Inventors
Jonathan C. V. Richardson
Frederick H. Hoffman
By  W. S. McDowell
Attorney Patented Nov. 17, 1942

2,302,574

UNITED STATES PATENT OFFICE 2,302,574

METHOD FOR PRODUCING NUT BUTTER

Jonathan C. V. Richardson and Frederick H. Hoffman, Columbus, Ohio

Application April 5, 1939, Serial No. 266,210

6 Claims. (Cl. 99—128)

This invention relates to an improved method and machine for reducing edible nuts, particularly peanuts, to a state of fine subdivision in the presence of oleaginous addition agents for the production of a butter-like food compound.

Peanut butter, prepared by grinding the clean kernels of roasted peanuts, is a rather stiff semi-solid mass and, while quite nutritious, it is objectionable to many users because of its dryness and the tendency thereof to adhere to the mouth when being eaten. Again, because of its stiffness, it is often too difficult to properly spread on bread or other bakery products. To increase its ability to spread and to overcome its excessively dry taste, it is customary to add certain edible oils in regulated quantities to the ground peanuts prior to packing the same. It has been found, however, that when sufficient oils are admixed with the ground nuts to produce the desired plasticity to provide for smooth and convenient application of the butter to baked products, and to overcome undesired dryness, the oil content of the mixture is so high that the product on standing, or during shipment and storage, permits the oils contained therein to separate in part from the more solid portions of the body. This is objectionable to the users of such products, since the oil separation set forth is ordinarily of such a nature as to require the user to rework the separated oil into the body of the product or remove it completely therefrom.

It is one of the primary aims of the present invention to provide a method and means for producing an edible nut butter having a relatively high natural and added oil content and which butter, during its manufacture, is so thoroughly homogenized, or rendered of uniform composition, that it will highly resist liberation or separation of free oil from the more solid portions of the product.

In the attainment of this end, a method and means are provided for heating the nuts to relatively elevated temperatures while the same have applied thereto an oleginous addition agent and while undergoing reduction in size by the operation of grinding instrumentalities. Hitherto, peanut grinding mills have been operated at room temperatures, except for the heat developed by the grinding operation per se, and it has been found that greatly improved results are obtainable by applying artificially supplied heat thereto, particularly during the grinding and mixing operations while the nuts are coated with oils.

In accordance with the present invention, roasted and blanched peanuts, to which an oleaginous addition or stabilizing agent is applied, are fed between a pair of relatively movable grinding plates, while extraneous heat is applied to the plates and the nut kernels undergoing reduction to cause a forced swelling of the nut particles with a resultant finer grinding and an increase in surface area of the ground nut particles. The presence of the stabilizing agent (usually an edible hydrogenated oil) on the peanuts permits of the employment of higher grinding temperatures and, as a result of the finer grind, the said agent is uniformly distributed in adhering relation on the augmented surfaces of the reduced nut particles, preventing the starch grains composing the product from substantially contracting in size following the grinding and liberating the oils present thereon.

Following the reduction stage, the present invention provides an homogenizing or mixing stage, wherein additional oils, sweetening agents, or other consistency or flavor regulating compounds may be introduced in proportionate quantities into the reduced nut mixture. While within the homogenizing stage, the several products are subjected to required agitation, while under the influence of extraneously applied heat, to produce the final butter mixture, which is characterized by its uniformity in composition and its ability to resist separation of its oil and solid components.

Other objects of the invention reside in the provision of a nut grinding mill for producing nut butter, wherein the casing of the mill is provided with communicating passages or jackets adapted for the reception of a fluid heat carrier and by which the required operating temperatures of the mill are obtained; in the provision of pump means, synchronized with the operation of the grinding plates of the mill, for introducing in regulated and accurately proportioned amounts various addition agents to the nut kernels, and in other features and advantages hereinafter detailed.

In the accompanying drawings, forming a part of the specification, and in which similar characters of reference are used to indicate corresponding parts throughout the several views thereof:

Fig. 1 is a top plan view of a nut grinding mill having the structural features of the present invention;

Fig. 2 is a vertical longitudinal sectional view taken through the mill on the plane indicated by the line II—II of Fig. 1;

Fig. 3 is a vertical transverse sectional view on the line III—III of Fig. 2;

Fig. 4 is a similar view on the line IV—IV of Fig. 2;

Fig. 5 is a vertical sectional view on the plane disclosed by the line V—V of Fig. 2;

Fig. 6 is a view in end elevation, partly in section, of the pump mechanism of the mill, the plane of the figure being indicated by the line VI—VI of Fig. 2;

Fig. 7 is a detail horizontal sectional view of the pump driving mechanism on the plane disclosed by the line VII—VII of Fig. 2.

In carrying out the present invention, the grinding mill of the type disclosed in the drawings is employed. In the particular form of the mill selected for illustration, the same embodies a casing 10, formed internally to provide a nut-receiving hopper 11, a grinding or reducing chamber 12 and a mixing or homogenizing chamber 13, the chamber 12 being arranged substantially vertically within the casing, while the chamber 13 communicates openly with the bottom portions of the chamber 12, but extends horizontally and longitudinally of the mill. The bottom of the casing is formed with spaced supporting pads 14, by which the casing may be mounted on a suitable supporting base in a stable upright manner. One end of the casing is formed with a detachable head casting 15, in which is formed a transmission chamber 16, the latter being normally covered by a removable end plate 17. Rotatably mounted in a bearing 18, formed in the casting 15, and in a horizontally aligned bearing 19, formed in one of the walls of the casing 10, is a main drive shaft 20, this shaft being driven by a suitable motor, belt wheel or other source of power.

Arranged on the squared portion 21 of the shaft 20, and disposed in the restricted bottom of the hopper 11 is a feed auger 22 by which whole roasted peanuts in a clean state are advanced in regulated quantities through the restricted outlet 23 in the bottom of the hopper toward and into engagement with the stationary and rotatable grinding plates 24 and 25, respectively, of the mill. The rotatable plate 25 is mounted on the squared portion 21 of the shaft 20 for rotation in unison with the latter, while the stationary plate 24 may be integrally formed with one of the walls of the casing 10 or separately formed and suitably fixed on the casing wall. Both plates are provided with complemental juxtaposed, tangentially extending ribs 26, which project laterally from the bodies of the plates so that the nut kernels removed from the hopper through the outlet 23, will be received by the inner curved surfaces 27 of the plate 25 and advanced gravitationally into engagement with the grinding ribs 26, the ground or reduced nuts being discharged from the outer peripheral portions of said plates and dropped into the mixing chamber 13.

One of the important features of the present invention resides in supplying the nuts, while they are undergoing reduction between the grinding plates, with an oleaginous stabilizing or addition agent in the form of an edible hydrogenated oil. This is done by providing one end of the drive shaft 20 with a worm gear 28, which meshes with a similar gear 29, fixed to rotate with a transversely extending countershaft 30, the latter having its ends journaled in bearings 31 provided in the walls of a pump-receiving boxing 32, which is detachably connected with one of the walls of the casing 10. Fixed on the shaft 30 are spaced mitre gears 33, which mesh with corresponding gears 34, carried by the operating shafts 35 of a set of three pumps, the latter being indicated in Fig. 6 by the reference characters 36, 37 and 38. These pumps may be of any suitable design adapted for the regulated transmission and displacement of viscous fluids.

The inlet line 39 of the pump 37 leads from the tank or other receiver, not shown, adapted for the reception of the hydrogenated oil which is here referred to as the stabilizing agent. This oil enters the pump 37 through the line 39 and is positively discharged from said pump by the action of its rotors through the outlet line 40. As shown in Fig. 2, this outlet line is coupled with a small diameter longitudinally extending bore 41 provided in the casing wall forming the bottom of the hopper 11, the said bore extending to the central portions of the grinding plates 24 and 25, so that the nuts delivered to said plates from the hopper 11 will be sprayed or coated with the stabilizing agent when engaged by the grinding ribs of said plates.

The pump 36 has its inlet side connected with a pipe line 42 which leads to a receiver, not shown, containing pure edible oil such, for example, as a product known commercially as green peanut oil. The outlet line of the pump 36 is coupled with an inclined passage 43, formed in the walls of the casing 10 below the hopper 11, as shown more particularly in Figs. 2 and 3. The passage 43 terminates at its opposite end in the plane of merger of the grinding and mixing chambers 12 and 13, respectively. By this means, an added amount of edible oil may be supplied to the ground peanuts discharged from the plates 24 and 25. In certain instances, it has been proposed to add pure bees' honey to peanut butter to improve the taste and, in the present instance, this may be done by the employment of the pump indicated at 38. The inlet line 44 of this pump extends to a source of supply, not shown, of bees' honey in a liquid or flowable state, so that by the operation of the pump 38, such a sweetening agent will be discharged through the outlet line 45, which leads to a diagonal passage 46 arranged in the casing 10 in parallel order with the passage 43, and by which the sweeting agent is delivered to the ground mix released from the plates 24 and 25.

It will be obvious that mitre gears 33 and 34 having different tooth ratios may be used at will in order to secure any desired relative proportioning of the liquid-like materials handled by the pumps 36, 37 and 38. The pump boxing 32 is provided with a removable front plate 47 so that the pumps and associated pipe lines will be conveniently accessible for repair or adjustment purposes.

To produce a smoothly blended mixture of the ground nuts and the various addition agents, the mill provides a homogenizing or mixing stage of which the chamber 13 forms a part. The mixture of ground nuts and the several addition agents drops into the chamber 13 from the grinding chamber 12, where the mixture is engaged and thoroughly agitated by a worm-type conveyor 48. This conveyor is equipped with a shaft 49 with which it rotates, one end of the shaft being journaled in a bearing 50, formed horizontally in the head casting 15, while the opposite end of the shaft is received within the bearing 51 formed in a discharge spout casting 52.

The conveyor or agitator 48 has its shaft 49 extended beyond the bearing 50 into the chamber 16 of the casting 15, where the shaft 49 is provided with a spur gear 53 meshing with a somewhat smaller gear 54, the latter being keyed as at 55 on the hub of an idler gear 56. The latter gear is mounted for rotation on a stud shaft 57, projecting from the head casting 15. The gear 56 meshes with a drive gear 58 fixed on the main shaft 20, so that during rotation of the latter, movement will be imparted simultaneously to the feed auger 22 of the hopper 11, the rotatable grinding plate 25, the pumps 36, 37 and 38 and the conveyor 48 in a uniform and synchronized manner.

Another important feature of the present invention resides in providing the walls forming the casing 10 with a plurality of intercommunicating compartments or jackets 59 which are adapted for the reception of a circulating fluid heat carrier, preferably hot water or steam. Such a heated fluid may enter the casing, from any suitable source, by way of the pipe line 60, disclosed in Fig. 3, and will pass around the bottom and side walls of the hopper 11 as well as around the walls of the mixing chamber 13 and communicating jackets formed in the discharge spout casting 52, additional communicating jackets being located adjacent to the grinding plates 24 and 25, as disclosed at 61 in Fig. 2 and at 62 in Fig. 4. By the employment of the extraneously supplied heat, developed by the circulation of hot water through the jackets described, the peanut butter mixture during the grinding and mixing steps attains a temperature of the order of 190° Fahr. which is substantially above the usual grinding temperatures employed in operations of this kind. These higher temperatures have been found to be very beneficial in the production of a stable peanut butter mixture of a readily spreadable consistency and in which free oil separation under ordinary temperature variations is precluded or minimized.

It is presently believed that the heating of the mixture enables a finer reduction of the nut kernels to be obtained, together with an even distribution of the stabilizing agent therethrough, the said agent adhering to the starches composing the nut kernels and preventing contraction of the starch grains following grinding so that sufficient surface area of the reduced solids is presented to which the oils of the mixture will tenaciously adhere, thereby preventing subsequent separation of the oils in a free state from the solids. The viscous hydrogenated oil is also so well disseminated in the ground nuts by the combined grinding and heating operations that it readily combines with or absorbs the natural peanut oils released from the nut kernels or the green peanut oils added to the mixture. In fact, it is practical to add as much as ten per cent by weight of a peanut oil, olive oil or other edible oil to the ground mixture without excess oil separation from the finished product. Also, there may be added sweetening fluids, such as honey, glucose, maple syrup, without separation thereof in the finished product.

Our improved heat controlled peanut butter mill includes the synchronized pumps 36, 37 and 38 which will deliver any desired proportion of the stabilizing agent on the peanuts before the latter are ground and, also, the desired proportion of oil to the reduced peanut mass leaving the milling plates. At this point, if a sweetening agent is desired, it may be supplied by the third pump. This mixture, with the several ingredients thereof automatically proportioned, is then delivered to the homogenizer which by the combined effects of heat and agitation, blend and uniformly merge the several ingredients of the mixture in desired relative proportions throughout the mass of the composition so that when discharged, it will possess the desired taste, consistency and resistance to oil separation.

The use of the mill in producing a food compound known commercially as peanut butter has been particularly stressed. It is obvious, however, that the invention is applicable to the grinding of all types of edible nuts for the production of food pastes entirely different in taste from peanut butter or blends thereof. The stabilizing agent consists preferably of a hydrogenated peanut oil with a melting point as high as 140° Fahr., the use of such an agent being made possible by the heat supplied to the mill.

What is claimed is:

1. The method of manufacturing compounded peanut butter comprising distributing on the surfaces of roasted nut kernals a high melting point hydrogenated oil, grinding the nut kernels with the oil contained thereon to a state of fine subdivision while the nuts are maintained at a temperature in excess of that developed by ordinary grinding, supplying additional quantities of an edible oil to the ground mixture, and thoroughly agitating and working said mixture to produce a uniform blend of the several ingredients comprising the mixture throughout the mass of the latter.

2. The method of producing compounded peanut butter comprising applying to roasted peanut kernels a hydrogenated oil having a melting point not substantially in excess of 140° Fahr., subjecting the oil-coated peanuts to a grinding operation to reduce the same to a state of fine subdivision with the hydrogenated oil uniformly distributed in the ground product, adding additional quantities of an edible oil to the ground product, and working the ground product to produce a uniform distribution of the oils throughout the same, all of the operations being performed while the materials are maintained at a temperature above that developed by the grinding operation.

3. The method of producing compounded peanut butter which comprises applying to whole roasted peanuts an oleaginous stabilizing agent, grinding said nuts with the agent contained thereon to a state of fine subdivision while the nuts are maintained at a temperature of the order of 190° Fahr., adding additional quantities of a free flowing edible oil to the ground mixture, and, while continuing the heating of the mixture, working the same mechanically to uniformly blend and distribute the oils thruoghout the mass thereof.

4. The method of manufacturing an edible nut compound, comprising grinding roasted nut kernels in the presence of an oleaginous addition agent to a state of fine subdivision, heating the nut kernels and the addition agent during such grinding to a temperature substantially in excess of that incident to normal grinding, adding consistency regulating and flavoring agents to the ground nut kernels, and homogenizing the resultant mixture under the influence of extraneously supplied heat to produce a food compound wherein the several ingredients thereof are uniformly proportioned and blended throughout the mass of the compound.

5. In the manufacture of compounded peanut butter, the steps comprising coating whole roasted peanuts with a hydrogenated edible oil, grinding the nuts with the oil contained thereon to a state of fine subdivision while the nuts are maintained at a temperature of the order of 190° Fahr., adding additional quantities of a relatively free flowing edible oil to the ground mixture, and then additionally working the mixture while the same is under the influence of extraneously applied heat to produce a butter wherein the several ingredients are uniformly proportioned and blended throughout the mass thereof.

6. The method of producing compounded peanut butter comprising the steps of introducing roasted peanut kernels into a heated grinding mechanism, continuously supplying hydrogenated oil at a regulated rate to the kernels as the same are being ground, continuously supplying additional consistency regulating and flavoring agents at regulated rates to the ground mixture immediately following the grinding operation, and homogenizing the resultant mixture during the continuous application of heat.

JONATHAN C. V. RICHARDSON.
FREDERICK H. HOFFMAN.